United States Patent
Sudo et al.

(10) Patent No.: US 9,879,181 B2
(45) Date of Patent: *Jan. 30, 2018

(54) NEMATIC LIQUID CRYSTAL COMPOSITION, LIQUID CRYSTAL DISPLAY ELEMENT USING SAME

(71) Applicant: DIC CORPORATION, Tokyo (JP)

(72) Inventors: Go Sudo, Kita-adachi-gun (JP); Shotaro Kawakami, Kita-adachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,077

(22) Filed: Oct. 17, 2014

(65) Prior Publication Data

US 2015/0034873 A1    Feb. 5, 2015

Related U.S. Application Data

(62) Division of application No. 14/110,298, filed as application No. PCT/JP2012/059171 on Apr. 4, 2012.

(30) Foreign Application Priority Data

Apr. 6, 2011   (JP) .................. 2011-084486

(51) Int. Cl.
  C09K 19/12   (2006.01)
  C09K 19/30   (2006.01)
  C09K 19/44   (2006.01)
  C09K 19/04   (2006.01)

(52) U.S. Cl.
  CPC .......... *C09K 19/3066* (2013.01); *C09K 19/12* (2013.01); *C09K 19/44* (2013.01); *C09K 2019/0448* (2013.01); *C09K 2019/122* (2013.01); *C09K 2019/123* (2013.01); *C09K 2019/301* (2013.01); *C09K 2019/303* (2013.01); *C09K 2019/3004* (2013.01); *C09K 2019/305* (2013.01); *C09K 2019/3009* (2013.01); *C09K 2019/3013* (2013.01); *C09K 2019/3016* (2013.01); *C09K 2019/3027* (2013.01); *C09K 2019/3036* (2013.01); *Y10T 428/10* (2015.01)

(58) Field of Classification Search
  CPC .... C09K 19/12; C09K 19/44; C09K 19/3066; C09K 2019/122; C09K 2019/123; C09K 2019/303; C09K 2019/3036; C09K 2019/305; C09K 2019/301; C09K 2019/3013; C09K 2019/3016; C09K 2019/3027; C09K 2019/3009; C09K 2019/3004; C09K 2019/0448

USPC .......... 252/299.66, 299.63, 299.01
See application file for complete search history.

(56) References Cited

U.S. PATENT DOCUMENTS

| | | | |
|---|---|---|---|
| 7,749,403 B2 * | 7/2010 | Satou ................. | C09K 19/12 252/299.01 |
| 7,767,110 B2 | 8/2010 | Fujita et al. | |
| 7,914,860 B2 | 3/2011 | Fujita et al. | |
| 8,637,125 B2 | 1/2014 | Goto et al. | |
| 8,808,814 B2 * | 8/2014 | Matsumura et al. .......... 428/1.1 | |
| 8,821,993 B2 * | 9/2014 | Hattori et al. ................ 428/1.1 | |
| 8,920,674 B2 | 12/2014 | Yanai et al. | |
| 9,023,439 B2 * | 5/2015 | Sudou ................. | C09K 19/12 252/299.5 |
| 2008/0308768 A1 | 12/2008 | Klasen-Memmer et al. | |
| 2009/0032771 A1 | 2/2009 | Saito | |
| 2009/0035630 A1 | 2/2009 | Kumada et al. | |
| 2009/0050843 A1 | 2/2009 | Kawakami et al. | |
| 2009/0065740 A1 | 3/2009 | Hattori et al. | |
| 2009/0090892 A1 | 4/2009 | Fujita et al. | |
| 2009/0109392 A1 | 4/2009 | Hsieh et al. | |
| 2009/0206300 A1 | 8/2009 | Satou et al. | |
| 2009/0324853 A1 | 12/2009 | Bernatz et al. | |
| 2012/0145957 A1 | 6/2012 | Saito | |
| 2012/0261614 A1 | 10/2012 | Goto et al. | |
| 2013/0112918 A1 | 5/2013 | Matsumura et al. | |
| 2013/0183460 A1 | 7/2013 | Klasen-Memmer et al. | |
| 2013/0207039 A1 | 8/2013 | Hattori et al. | |

(Continued)

FOREIGN PATENT DOCUMENTS

CN   101323596 A   12/2008
EP    0474062 A2   3/1992

(Continued)

OTHER PUBLICATIONS

International Search Report dated May 15, 2012, issued in corresponding International Application No. PCT/JP2012/059171.

(Continued)

*Primary Examiner* — Chanceity Robinson
(74) *Attorney, Agent, or Firm* — Westerman, Hattori, Daniels & Adrian, LLP

(57) ABSTRACT

A nematic liquid crystal composition according to the invention is used for a liquid crystal display element for an active matrix drive for TV applications or the like for which a high speed and a wide viewing angle are required. The liquid crystal composition has a negative dielectric anisotropy having a large absolute value and also has a sufficiently low viscosity. Therefore, the liquid crystal composition has excellent characteristic properties, that is, a high speed response, good display quality and a suppressed display defect, and is therefore suitable as a practical liquid crystal composition. Further, a liquid crystal display element produced using the liquid crystal composition can be used favorably as a liquid crystal display element of a VA type or the like.

15 Claims, No Drawings

(56) References Cited

U.S. PATENT DOCUMENTS

| | | |
|---|---|---|
| 2014/0070142 A1 | 3/2014 | Sudo et al. |
| 2015/0034873 A1 | 2/2015 | Sudo et al. |

FOREIGN PATENT DOCUMENTS

| | | |
|---|---|---|
| EP | 2695929 A1 | 2/2014 |
| EP | 2700697 A1 | 2/2014 |
| JP | 59-219382 A | 12/1984 |
| JP | 08-104869 A | 4/1996 |
| JP | 2001-354967 A | 12/2001 |
| JP | 2005-314598 A | 11/2005 |
| JP | 2006-037054 A | 2/2006 |
| JP | 2006-233182 A | 9/2006 |
| JP | 2007-039639 A | 2/2007 |
| JP | 2008-505235 A | 2/2008 |
| JP | 2008-144135 A | 6/2008 |
| JP | 2008-308581 A | 12/2008 |
| JP | 2009-035630 A | 2/2009 |
| JP | 2009-40942 A | 2/2009 |
| JP | 2009-270080 A | 11/2009 |
| JP | 2012-097222 A | 5/2012 |
| TW | 200732458 A1 | 9/2007 |
| TW | 201215667 A1 | 4/2012 |
| TW | 201235450 A1 | 9/2012 |
| WO | 2007/077872 A1 | 7/2007 |
| WO | 2010/119779 A1 | 10/2010 |
| WO | 2011/024666 A1 | 3/2011 |
| WO | 2012/046590 A1 | 4/2012 |

OTHER PUBLICATIONS

International Search Report, dated Nov. 6, 2012, issued in corresponding application No. PCT/JP2012/074198 (2 pages).

Takashi, et al "Summary of Development of Nematic Liquid Crystal Composition for Display", Ekisho vol. 1, No. 1, 1997 (14 pages); relevant portion—p. 13, Table 6, No. 12.

Final Office Action dated Nov. 19, 2015, issued in U.S. Appl. No. 14/347,459 (13 pages).

Notice of Allowance dated Mar. 9, 2016, issued in U.S. Appl. No. 14/347,459 (5 pages).

Non-Final Office Action dated May 4, 2015, issued in U.S. Appl. No. 14/347,459 (11 pages).

* cited by examiner

NEMATIC LIQUID CRYSTAL COMPOSITION, LIQUID CRYSTAL DISPLAY ELEMENT USING SAME

CROSS-REFERENCE TO RELATED APPLICATIONS

This is a divisional of U.S. application Ser. No. 14/110,298 filed Nov. 26, 2013, which is a 371 of PCT/JP2012/059171 filed Apr. 4, 2012, the entire contents of which is incorporated herein by reference.

TECHNICAL FIELD

The present invention relates to a nematic liquid crystal composition having a negative dielectric anisotropy ($\Delta\in$) which is useful as a liquid crystal display material, and a liquid crystal display element using the same.

BACKGROUND ART

The liquid crystal display element is used in various home electric appliances, measuring instruments, panels for automobiles, word processors, electronic notebooks, printers, computers, and televisions as well as clocks and calculators. Representative examples of a liquid crystal display system include a TN (twist nematic) type, an STN (super twist nematic) type, a DS (dynamic photo scattering) type, a GH (guest host) type, an IPS (in-plane switching) type, an OCB (optical compensation birefringence) type, an ECB (electric control birefringence) type, a VA (vertical alignment) type, a CSH (color super homeotropic) type, and an FLC (ferroelectric liquid crystal). Moreover, as a driving system, there are a static driving, a multiplex driving, a simple matrix system, and an active matrix (AM) system driven by a TFT (thin-film transistor), a TFD (thin-film diode) or the like.

In these display systems, an IPS type, an ECB type, a VA type, a CSH type, and so forth have a characteristic of using a liquid crystal material having a negative $\Delta\in$. Among them, in particular, the VA-type display system by an AM driving is used for a display device, which requires a high speed and a wide viewing angle, for example, a television or the like.

Low-power driving, a high speed response, and a wide operation temperature range are required for the nematic liquid crystal composition used in a display system such as a VA type. That is, it is required that $\Delta\in$ is negative and its absolute value is large, the viscosity is low, and a transition temperature ($T_{ni}$) of nematic phase-isotropic liquid phase is high. Moreover, from the setting of $\Delta n \times d$, that is, the product of a refractive index anisotropy ($\Delta n$) and a cell gap (d), $\Delta n$ of the liquid crystal material is required to be controlled in an appropriate range in accordance with the cell gap. In the case of applying the liquid crystal display element to a television and so forth, a high speed response is emphasized and therefore, it has particularly been required to have a liquid crystal material having a low viscosity ($\eta$).

Until now, characteristics of a liquid crystal composition have been improved by determining in various ways a compound having a negative $\Delta\in$ with a large absolute value.

As a liquid crystal material having a negative $\Delta\in$, a liquid crystal composition using liquid crystal compounds (A) and (B) with a 2,3-difluorophenylene skeleton (see Patent Literature 1) as shown below is disclosed.

[Chemical Formula 1]

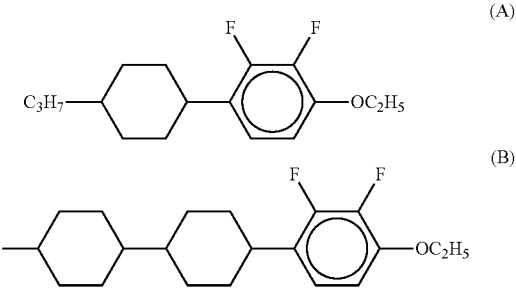

Although the liquid crystal composition uses liquid crystal compounds (C) and (D) as a compound having a $\Delta\in$ of almost 0, in a liquid crystal composition requiring a high speed response such as a liquid crystal television, a sufficiently low viscosity is not achieved by the above liquid crystal composition.

[Chemical Formula 2]

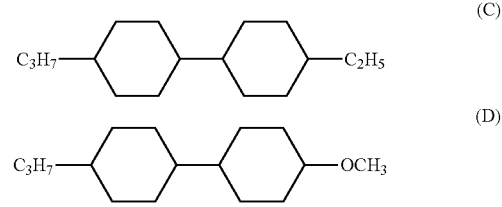

Meanwhile, a liquid crystal composition using a compound represented by formula (E) has been already disclosed. However, the composition is a liquid crystal composition with a low $\Delta n$ and obtained by combining liquid crystal compound (D) above (see Patent Literature 2), or a liquid crystal composition (see Patent Literature 3) obtained by adding a compound (an alkenyl compound) having an alkenyl group in the molecule like liquid crystal compound (F) for improving response speed. Therefore, further investigation is needed to have both a high $\Delta n$ and a high reliability.

[Chemical Formula 3]

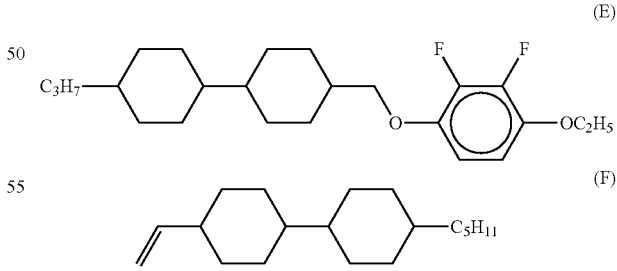

In addition, although the liquid crystal composition using a compound represented by formula (G) has been already disclosed (see Patent Literature 4), because this liquid crystal composition is a liquid crystal composition containing a compound including an alkenyl compound like the liquid crystal compound (F), there has been problems like easy occurrence of burn-in or a display defect such as display unevenness.

[Chemical Formula 4]

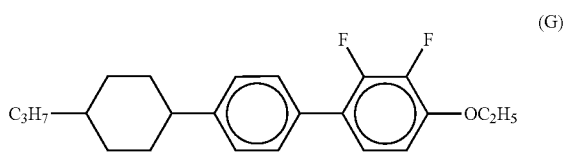
(G)

The influence of the liquid crystal composition including an alkenyl compound on a display defect has been already disclosed (see Patent Literature 5). However, in general, when the content of an alkenyl compound decreases, η of a liquid crystal composition increases, making it difficult to achieve a high speed response. As a result, it was difficult to achieve both the suppression of display defect and the high speed response.

Accordingly, even if a compound with a negative Δ∈ value is combined with liquid crystal compounds (C), (D), and (F), it was difficult to have both a high Δn and a low η and also to develop a liquid crystal composition with a negative Δ∈ which has no display defect or a suppressed display defect.

A liquid crystal composition in which formula (A) and formula (G) are combined with formula (I) having Δ∈ of almost zero is disclosed (see Patent Literature 6). However, since extremely low pressure is employed for injecting a liquid crystal composition to a liquid crystal cell for a process of producing a liquid crystal display element, compounds with a low vaporization pressure are evaporated, and thus it is considered that the content thereof cannot be increased. For such reasons, as the liquid crystal composition has limited content of formula (I), it exhibits a high Δn but has a problem of significantly high viscosity. Thus, it has been required to achieve both a high Δn and a low viscosity.

[Chemical Formula 5]

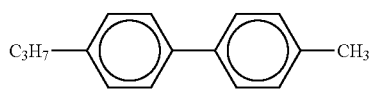
(I)

CITATION LIST

Patent Literatures

Patent Literature 1: JP 8-104869 A
Patent Literature 2: EP 04 74062 A
Patent Literature 3: JP 2006-37054 A
Patent Literature 4: JP 2001-354967 A
Patent Literature 5: JP 2008-144135 A
Patent Literature 6: WO 2007/077872

SUMMARY OF INVENTION

Technical Problem

Problems to be solved by the invention is to provide a liquid crystal composition having sufficiently a low η and negative Δ∈ having a large absolute value without lowering Δn and $T_{ni}$, and also a liquid crystal display element of a VA type or the like using the composition, which has no display defect or a suppressed display defect.

Solution to Problem

Inventors of the invention examined various biphenyl derivatives and fluorobenzene derivatives, and found that the above problems can be solved by combination of specific compounds. The invention is completed accordingly.

The present invention provides a liquid crystal composition containing, as a first compound, a compound represented by formula (I) with a content of 5% to 25%, and,

[Chemical Formula 6]

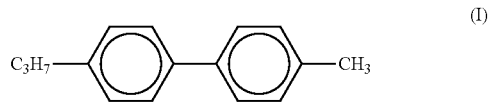
(I)

as a second compound, a compound having a negative dielectric anisotropy (Δ∈) with an absolute value of greater than 3, and a liquid crystal display element using the same.

Advantageous Effects of Invention

The liquid crystal composition of the invention having a negative Δ∈ has a sufficiently low viscosity without lowering Δn and $T_{ni}$. As such, a liquid crystal display element of a VA type or the like using the composition has a high speed response and a suppressed display defect, and therefore it is very useful.

DESCRIPTION OF EMBODIMENTS

The liquid crystal composition of the invention contains, as a first component, a compound represented by formula (I),

[Chemical Formula 7]

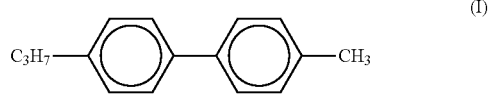
(I)

and the content thereof is preferably 5 to 25%, in which the lower limit is preferably 5%, preferably 8%, preferably 10%, and preferably 11% and the upper limit is preferably 20%, preferably 18%, and preferably 15%. In particular, the content of the compound is preferably 10% to 25% to obtain a high Δn. However, if suppressing the precipitation at a low temperature is believed to be important, the content is preferably 3% to 15%.

The liquid crystal's composition contains, as a second component, a compound having a negative Δ∈ with an absolute value of higher than 3. The content thereof is preferably 10% to 90%, more preferably 20% to 80%, and particularly preferably 40% to 70%.

Specifically, the second component is one type, or two or more types of compounds selected from a group of compounds represented by formula (II-1) and (II-2):

[Chemical Formula 8]

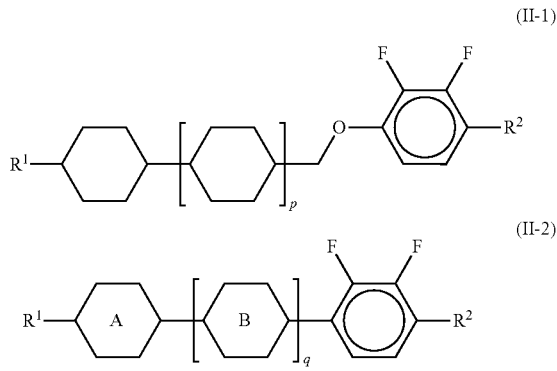

(II-1)

(II-2)

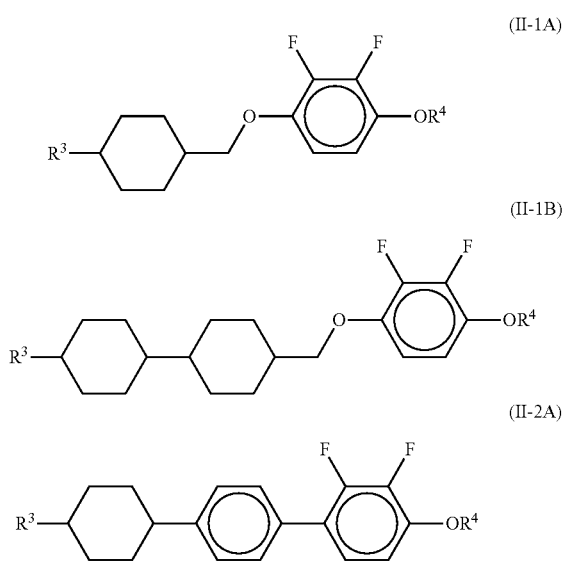

(II-1A)

(II-1B)

(II-2A)

(wherein, $R^1$ and $R^2$ each independently represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one —$CH_2$— or two or more non-adjacent —$CH_2$— present in $R^1$ and $R^2$ may be each independently substituted with —O— and/or —S—, one or two or more hydrogen atoms present in $R^1$ and $R^2$ may be each independently substituted with a fluorine atom or a chlorine atom, ring A and ring B each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, and p and q each independently represent 0, 1, or 2).

It is more preferable that $R^1$ and $R^2$ in the formulas each independently represent a linear alkyl group or alkoxy group having 1 to 5 carbon atoms, or an alkenyl group or alkenyloxy group having 2 to 5 carbon atoms. It is particularly preferable that $R^1$ is an alkyl group having 1 to 5 carbon atoms and $R^2$ is an alkoxy group having 1 to 5 carbon atoms.

It is more preferable that p and q each independently represent 0 or 1.

It is more preferable that the ring A and the ring B each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, or a 2,3-difluoro-1,4-phenylene group, and particularly preferably a trans-1,4-cyclohexylene group or a 1,4-phenylene group.

The liquid crystal composition contains one type, or two or more types of component 2 and it is preferable for the liquid crystal composition to contain 2 types to 10 types.

The liquid crystal composition of the invention has $\Delta\epsilon$ at 25° C. of −2.0 to −6.0. More preferably, it is −2.5 to −5.0 and particularly preferably −2.5 to −3.5. An at 25° C. is preferably 0.08 to 0.13. More preferably, it is 0.09 to 0.13, and particularly preferably 0.10 to 0.12. In particular, for responding to a thin cell gap, it is preferably 0.10 to 0.13, and for responding to a thick cell gap, it is preferably 0.08 to 0.10. η at 20° C. is 10 to 30 mPa·s. More preferably, it is 10 to 25 mPa·s, and particularly preferably 10 to 20 mPa·s. $T_{ni}$ is 60° C. to 120° C., more preferably 70° C. to 100° C., and particularly preferably 70° C. to 85° C.

The compound represented by formula (II-1) is more preferably one type, or two or more types selected from the compounds represented by formulas (II-1A) and (II-1B), and the compound represented by formula (II-2) is more preferably formula (II-2A):

($R^3$ and $R^4$ each independently represent an alkyl group having 1 to 10 carbon atoms or an alkenyl group having 2 to 10 carbon atoms, and one or two or more hydrogen atoms present in $R^3$ and $R^4$ may be each independently substituted with a fluorine atom).

It is more preferable that $R^3$ and $R^4$ each independently represent a linear alkyl group having 1 to 5 carbon atoms or an alkenyl group having 2 to 5 carbon atoms, and particularly preferably an alkyl group having 1 to 5 carbon atoms.

The compound represented by formulas (II-1A), (II-1B) and formula (II-2A) may be used singly, or the compound represented by formulas (II-1A) and (II-1B) may be combined, the compound represented by formulas (II-1A) and (II-2A) may be combined, the compound represented by formulas (II-1B) and (II-2A) may be combined, or all the compounds represented by formulas (II-1A), (II-1B) and formula (II-2A) may be combined.

According to the combination, a fluctuation in the compositional ratio of the liquid crystal composition can also be suppressed.

The liquid crystal composition of the invention may also contain, as a third component, one type, or two or more types of the compounds selected from a group of compounds represented by formula (III-A) to formula (III-J),

[Chemical Formula 9]

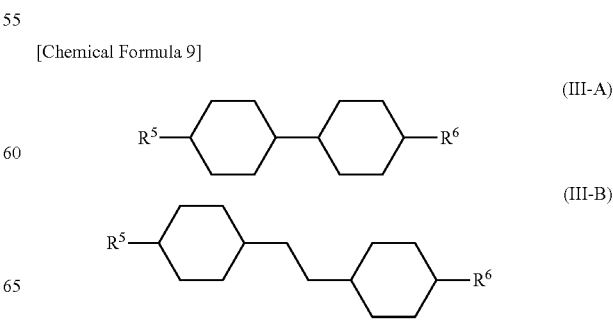

(III-A)

(III-B)

-continued

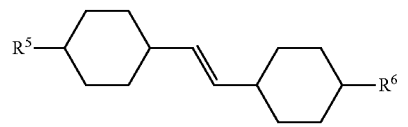
(III-C)

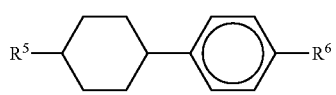
(III-D)

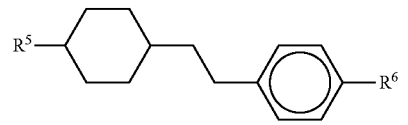
(III-E)

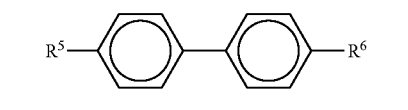
(III-F)

(III-G)

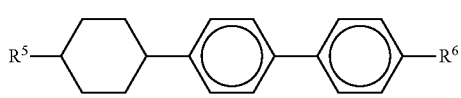
(III-H)

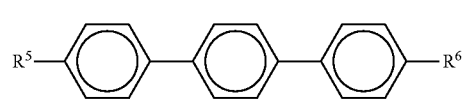
(III-I)

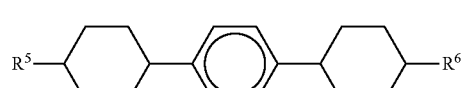
(III-J)

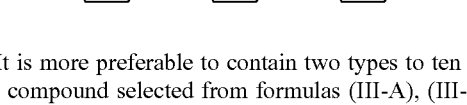

It is more preferable to contain two types to ten types of the compound selected from formulas (III-A), (III-D), (III-F), (III-G) and (III-H). Meanwhile, $R^5$ represents an alkyl group having 1 to 5 carbon atoms or an alkenyl group having 2 to 5 carbon atoms and $R^6$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, and it is more preferable that $R^5$ represents an alkyl group having 1 to 5 carbon atoms and $R^6$ represents an alkyl group having 1 to 5 carbon atoms or an alkoxy group having 1 to 5 carbon atoms. Meanwhile, regarding the compound represented by formula (III-F), for cases in which $R^5$ represents a methyl group and $R^6$ represents a propyl group, and $R^5$ represents a propyl group and $R^6$ represents a methyl group, formula (III-F) would represent a compound which is the same as the compound represented by formula (I). Thus, from among the compounds represented by formula (III-F), a compound in which $R^5$ represents a methyl group and $R^6$ represents a propyl group and a compound in which $R^5$ represents a propyl group and $R^6$ represents a methyl group are excluded.

It is preferable that the liquid crystal composition of the invention contains simultaneously formula (I), formulas (II-1A), (II-2A) and formula (III-A). It is preferable to contain simultaneously formula (I), formulas (II-1B), (II-2A) and formula (III-A). It is particularly preferable to contain simultaneously formula (I), the formulas (II-1A), (II-1B), (II-2A) and formula (III-A).

The liquid crystal composition of the invention may also contain a common nematic liquid crystal, a smectic liquid crystal, a cholesteric liquid crystal, an anti-oxidant, a UV absorbing agent, a polymerizable monomer, or the like, in addition to the compounds described above.

For example, as a polymerizable monomer, a polymerizable compound such as biphenyl derivatives or terphenyl derivatives may be contained, and the content thereof is preferably 0.01% to 2%. In particular, it is preferable that, as a fourth component, the liquid crystal composition of the invention contains one type, or two or more types of the polymerizable monomers represented by formula (IV).

[Chemical Formula 10]

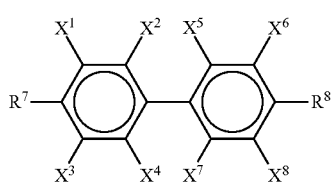
(IV)

(in the formula, $R^7$ and $R^8$ each independently represent any one of the following formula (R-1) to formula (R-15),

[Chemical Formula 11]

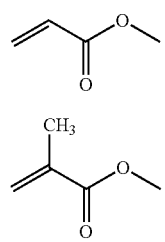
(R-1)

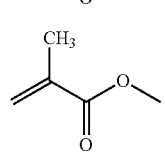
(R-2)

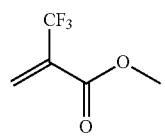
(R-3)

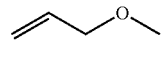
(R-4)

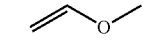
(R-5)

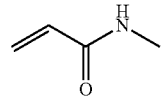
(R-6)

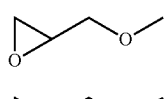
(R-7)

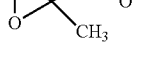
(R-8)

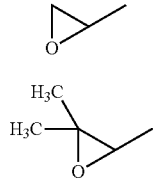
(R-9)

(R-10)

9

-continued

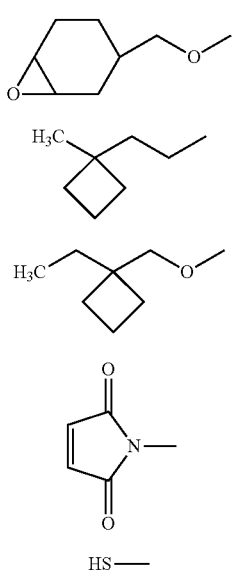

and $X^1$ to $X^8$ each independently represent a tifluoromethyl group, a trifluoromethoxy group, a fluorine atom, or a hydrogen atom).

The biphenyl structure in formula (IV) is more preferably formula (IV-11) to formula (IV-14), and it is particularly preferably formula (IV-11).

[Chemical Formula 12]

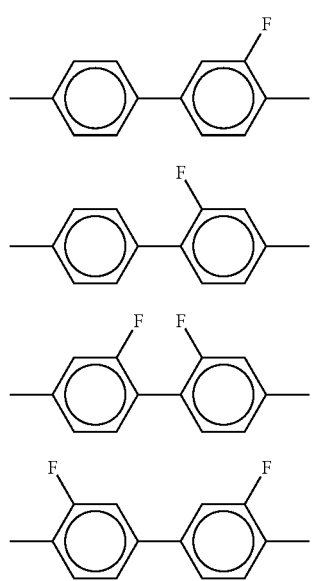

The polymerizable compound including the skeleton represented by formula (IV-11) to formula (IV-14) has an optimum alignment control force after polymerization, and thus a favorable alignment state is obtained.

For example, the polymerizable compound-containing liquid crystal composition which simultaneously contains formula (I), formulas (II-1A), (II-1B), (II-2A), formula (III-A) and formula (IV) has both a high Δn and a low viscosity, and thus when a liquid crystal display element of PSA mode or PSVA mode is prepared using the composition, there are excellent characteristics that a high speed response

10 can be realized due to a narrow gap corresponding to a high Δn and a low viscosity of the liquid crystal composition and the display unevenness is either suppressed or does not occur at all.

Further, although having a liquid crystal compound with an alkenyl group as a typical nematic liquid crystal or a smectic liquid crystal has an effect on lowering viscosity of the liquid crystal composition and is useful for a high speed response, it causes a reduction in VHR and induces a display defect. Thus, it is necessary to use it under separate considerations of focusing on response speed or focusing on reliability. In particular, for suppressing a display defect, it is important to lower the content of a liquid crystal compound having an alkenyl group or not to contain it. The content thereof is preferably lower than 10%, more preferably lower than 5%, and particularly preferably it is not contained. As described herein "not contained" means that it is not actively added, and it does not include an unavoidable inclusion like impurities during production, and it is preferably 0.5% or less, preferably 0.1% or less, and preferably the same or less than the detection limit (i.e., 10 ppm or so according to the measurement by gas chromatography).

Further, a liquid crystal composition containing a liquid crystal compound having a chlorine group is disclosed, but by significantly impairing the reliability, it causes a display defect. For such reasons, it is important to reduce the content of a liquid crystal compound having a chlorine group or not to contain the compound. The content is preferably lower than 10%, more preferably lower than 5%, and particularly preferably it is not contained. As described herein, "not contained" means that it is not actively added, and it does not include an unavoidable inclusion like impurities during production, and the content of the compound is preferably 0.5% or less, preferably 0.1% or less, and preferably the same or less than the detection limit (i.e., 10 ppm or so according to the measurement by gas chromatography).

The liquid crystal display element using the liquid crystal composition of the invention is useful in that both the a high speed response and a suppressed display defect are achieved, and it is particularly useful for a liquid crystal display element for an active matrix drive, and it can be applied to a VA mode, a PSVA mode, a PSA mode, an IPS mode, or an ECB mode.

EXAMPLES

Herein below, the invention is explained in greater detail by way of Examples, but the invention is not limited to the following Examples. Further, "%" for the compositions of Examples and Comparative Examples below means "% by mass."

Characteristics measured in Examples are as follows.

$T_{ni}$: nematic phase-isotropic liquid phase transition temperature (° C.)

Δn: refractive index anisotropy at 25° C.

Δ∈: dielectric anisotropy at 25° C.

η: viscosity at 20° C. (mPa·s).

Example 1

Herein below, the liquid crystal composition produced and physical properties thereof are described.

[Chemical Formula 13] (I)

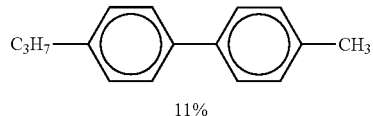

11%

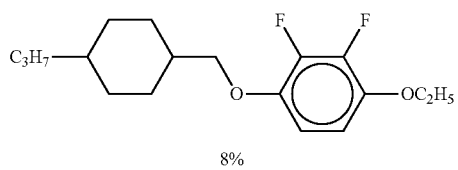
(II-1A)
8%

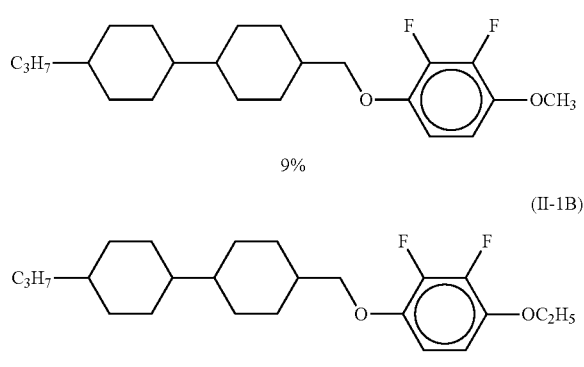
(II-1B) 9%

(II-1B) 10%

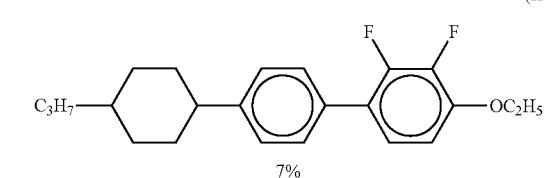
(II-2A) 7%

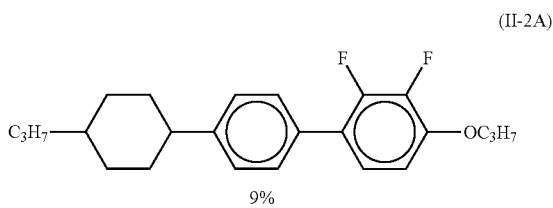
(II-2A) 9%

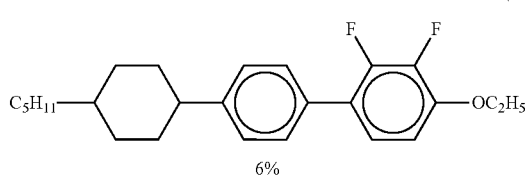
(II-2A) 6%

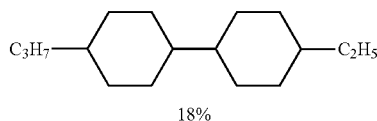
(III-A) 18%

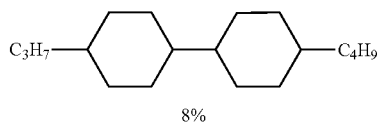
(III-A) 8%

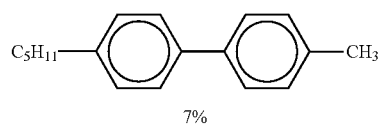
(III-F) 7%

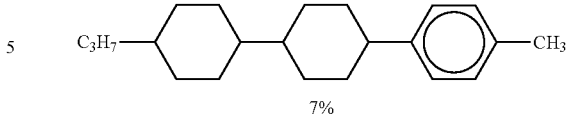
(III-G) 7%

Physical properties of the nematic liquid crystal composition shown in Example 1 are as follows: $T_{ni}$: 75.5° C., $\Delta n$: 0.108, $\Delta\epsilon$: −3.0, and $\eta$: 16.3 mPa·s. Further, as a result of measuring the response speed of the liquid crystal display element using the liquid crystal composition of the invention, it was found to be 9.3 msec. Further, according to the measurement of the voltage holding ratio (VHR), it was confirmed to have a high VHR. Meanwhile, the cell thickness was 3.5 μm, the alignment film was JALS2096, and the condition for measuring the response speed includes Von of 5.5 V, Voff of 1.0 V, a measurement temperature of 20° C., and DMS301 manufactured by AUTRONIC-MELCHERS was used. The condition for measuring VHR includes a voltage of 5 V, a frequency of 60 Hz, a temperature of 60° C., and VHR-1 manufactured by TOYO Corporation was used.

Even when an injection condition for liquid crystal cell (pressure and ODF method) is changed, there was no change in values of the physical properties.

Comparative Example 1

Hereinbelow, the liquid crystal composition produced and physical properties thereof are described.

[Chemical Formula 14]

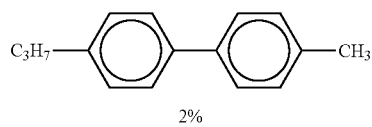
(I) 2%

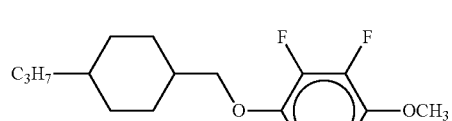
(II-1A) 6%

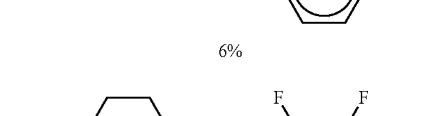
(II-1A) 8%

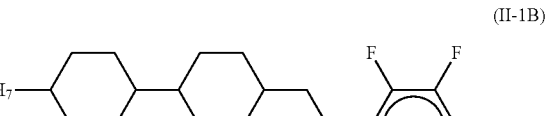
(II-1B)

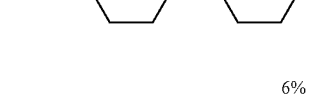
6%

-continued

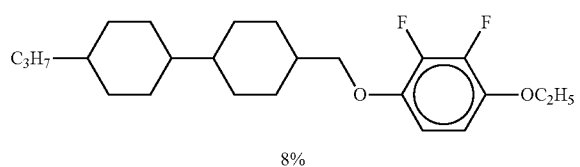
(II-1B)
8%

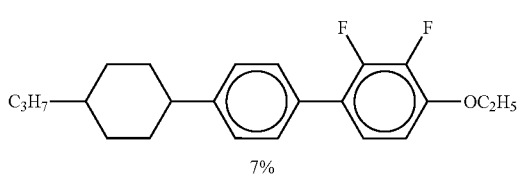
(II-2A)
7%

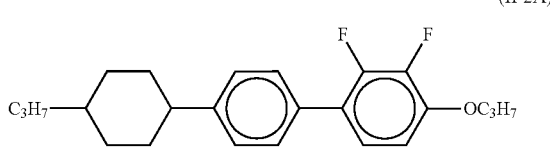
(II-2A)
6%

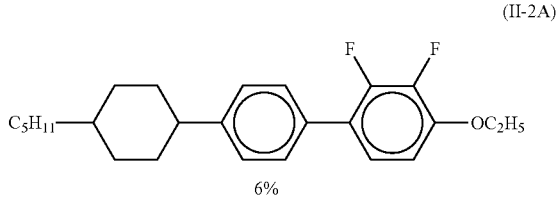
(II-2A)
6%

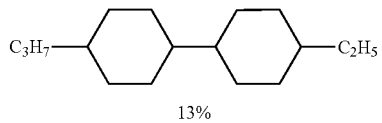
(III-A)
13%

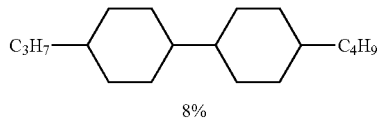
(III-A)
8%

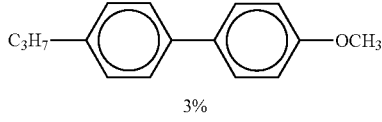
(III-F)
3%

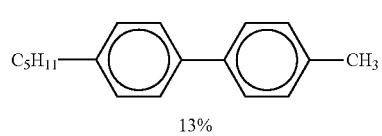
(III-F)
13%

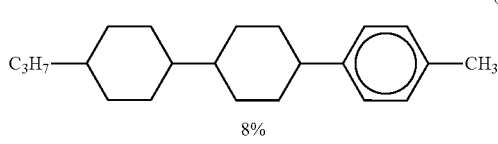
(III-G)
8%

-continued

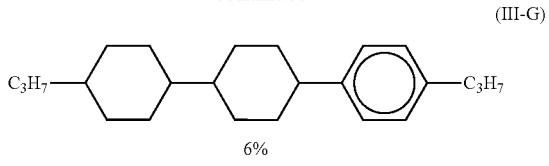
(III-G)
6%

Physical properties of the nematic liquid crystal composition shown in Comparative Example 1 are as follows: $T_{ni}$: 74.7° C., Δn: 0.109, Δ∈: −3.0, and η: 17.3 mPa·s. When the compound represented by formula (I) is contained at 2% like in Example 2 described in Reference Literature 6, the viscosity is higher than Example 1. Thus, it was found that containing formula (I) at 5% to 20%, which corresponds to the claim of the invention, is very important to obtain the effect of the invention. Further, as a result of measuring, the response speed of the liquid crystal display element using the liquid crystal composition, it was found to be 10.5 msec.

Comparative Example 2

In Comparative Example 1, an example of the liquid crystal display composition containing the compound represented by formula (I) at 2% is described. However, a liquid crystal composition in which the compound represented by formula (I) is not used and content of the compound of formula (III-F) with a large number of carbon atoms in a side chain, in which R5 is a pentyl group and R6 is a methyl group, is increased to 13% to 15% was prepared. Physical properties thereof are shown.

[Chemical Formula 15]

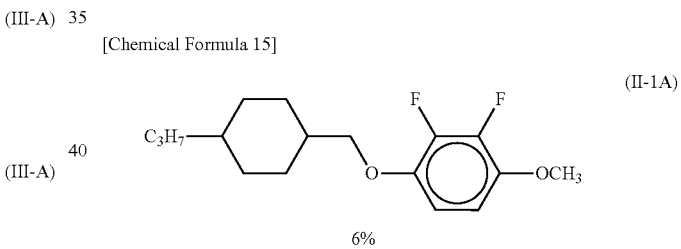
(II-1A)
6%

(II-1A)
8%

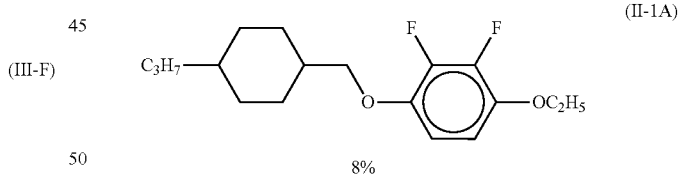
(II-1B)
6%

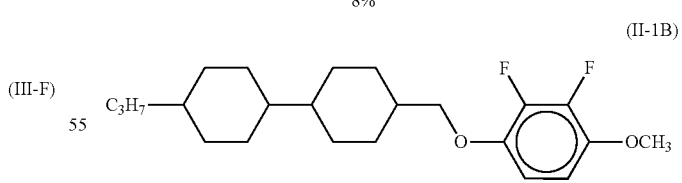
(II-1B)
8%

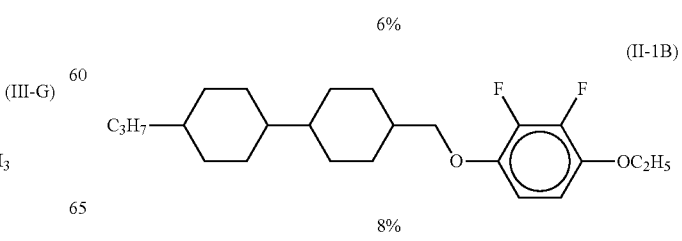

-continued

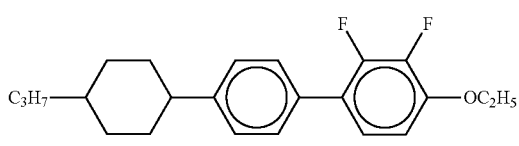
(II-2A)
7%

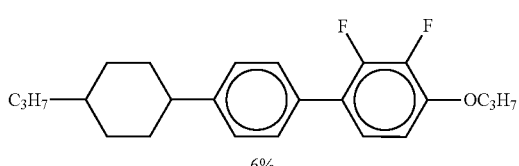
(II-2A)
6%

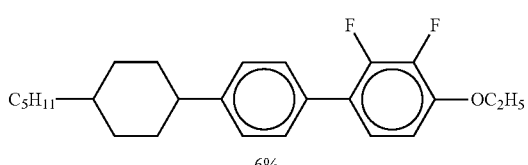
(II-2A)
6%

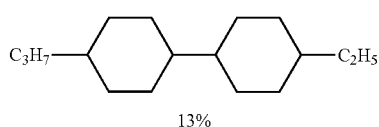
(III-A)
13%

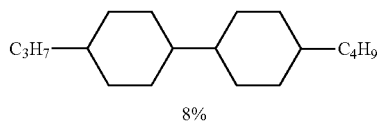
(III-A)
8%

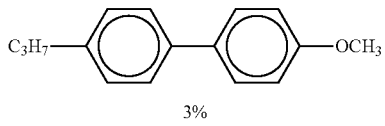
(III-F)
3%

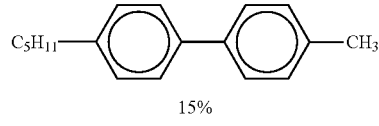
(III-F)
15%

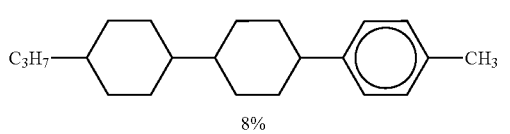
(III-G)
8%

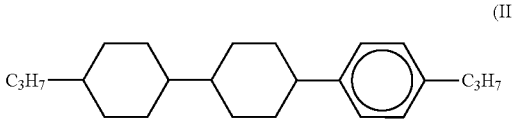
(III-G)
6%

The nematic liquid crystal composition shown in Comparative Example 2 does not contain formula (I) of the invention and physical properties thereof are as follows: $T_{ni}$: 75.0° C., $\Delta n$: 0.109, $\Delta\varepsilon$: −3.0, and η: 17.6 mPa·s. When Comparative Example 1 containing the compound represented by formula (I) at 2% and Comparative Example 2 not containing the compound represented by formula (I) are compared with Example 1 in terms of the physical properties, it was found that $T_{ni}$, $\Delta n$, and $\Delta\varepsilon$ values are almost identical, but η is increased by 6% in Comparative Example 1, and by 7% in Comparative Example 2.

Accordingly, it was found that, by increasing the content of the compound represented by formula (I) like in the invention, the liquid crystal composition containing a compound with a negative $\Delta\varepsilon$ can have improved η without lowering $\Delta n$ and $T_{ni}$.

Example 2

Hereinbelow, the liquid crystal composition produced and physical properties thereof are described.

[Chemical Formula 16]

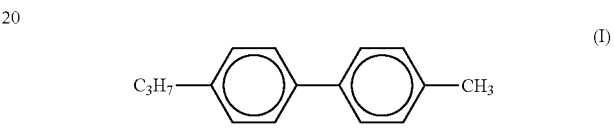
(I)
15%

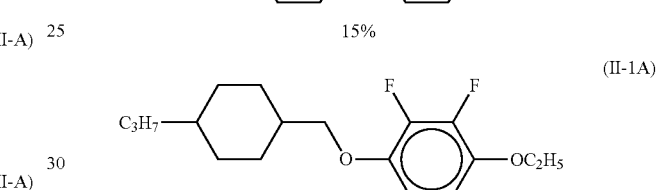
(II-1A)
8%

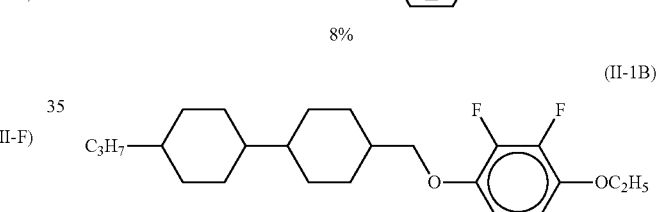
(II-1B)
8%

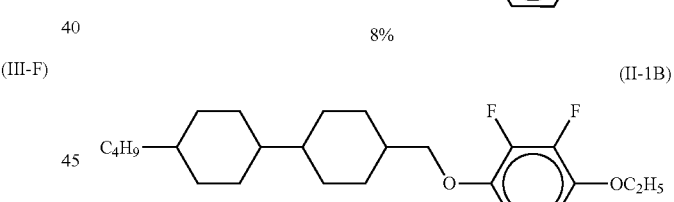
(II-1B)
8%

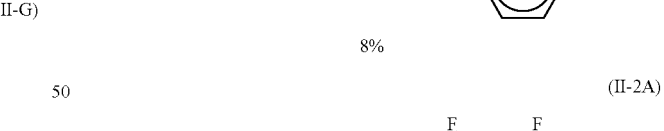
(II-2A)
7%

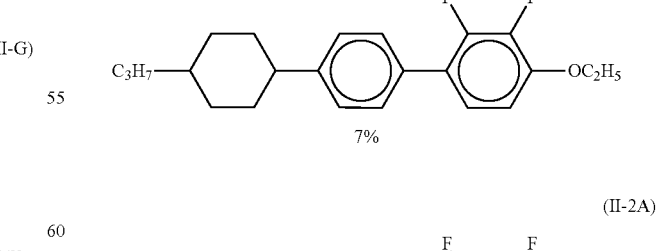
(II-2A)
6%

-continued

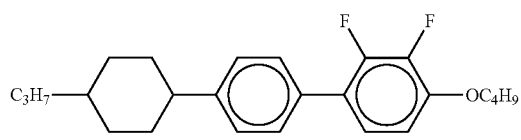

13% (II-2A)

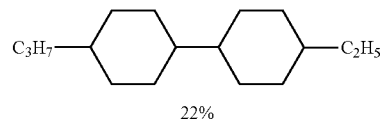

22% (III-A)

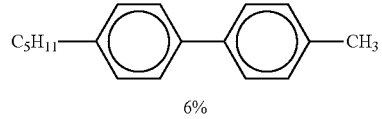

6% (III-F)

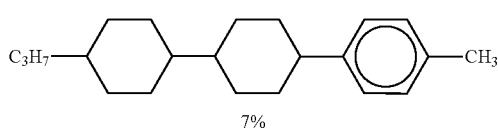

7% (III-G)

Physical properties of the nematic liquid crystal composition shown in Example 2 are as follows: $T_{ni}$: 71.2° C., $\Delta n$: 0.115, $\Delta\varepsilon$: −2.7, and $\eta$: 15.5 mPa·s.

Example 3

Hereinbelow, the liquid crystal composition produced and physical properties thereof are described.

[Chemical Formula 17]

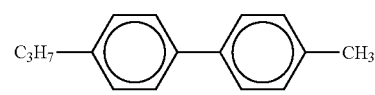

11% (I)

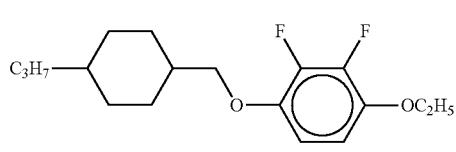

11% (II-1A)

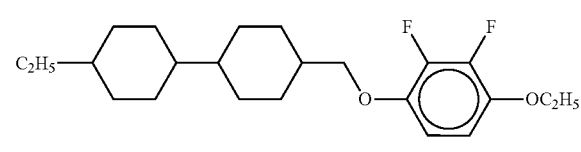

10% (II-1B)

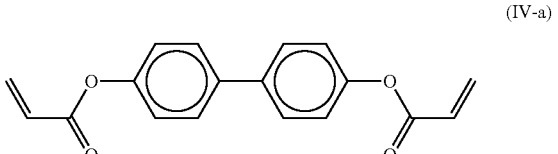

10% (II-1B)

-continued

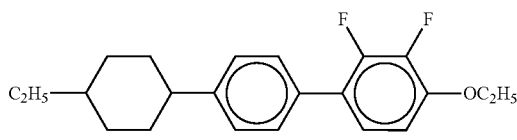

6% (II-2A)

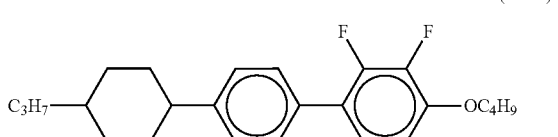

6% (II-2A)

6% (II-2A)

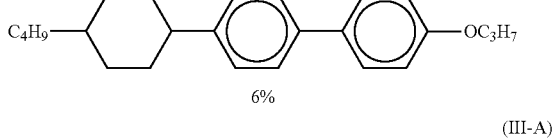

24% (III-A)

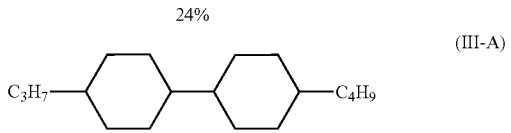

9% (III-A)

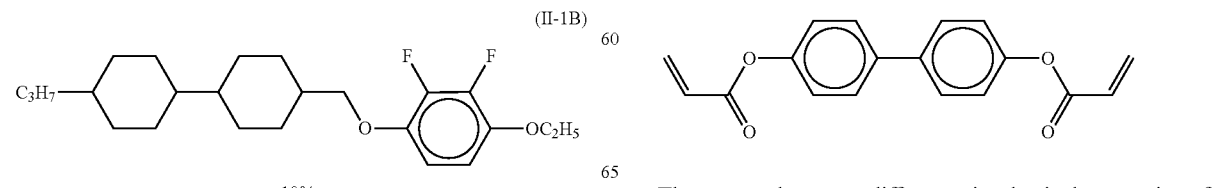

7% (III-G)

Physical properties of the nematic liquid crystal composition shown in Example 3 are as follows: $T_{ni}$: 75.3° C., $\Delta n$: 0.095, $\Delta\varepsilon$: −3.2, and $\eta$: 15.3 mPa·s.

Example 4

To 99.7% of the nematic liquid crystal composition shown in Example 1, 0.3% of the polymerizable compound represented by formula (IV-a) was added and homogeneously dissolved, and thus the polymerizable liquid crystal composition CLC-1 was prepared.

[Chemical Formula 18]

(IV-a)

There was almost no difference in physical properties of CLC-1 compared to the physical properties of the nematic liquid crystal composition shown in Example 1. CLC-1 was injected by vacuum injection to an ITO-attached cell which has been coated with a polyimide alignment film for inducing homeotropic alignment with a cell gap of 3.5 μm. After measuring pre-tilt angle of the cell (crystal rotation method), the liquid crystal cell was irradiated with UV rays using a high pressure mercury lamp through a filter for cutting UV rays of the same or shorter than 320 nm, while applying a rectangular wave of 1.8 V at a frequency of 1 kHz. The irradiation intensity on the cell surface was adjusted to 10 mW/cm² and the irradiation was performed for 600 seconds. As a result, a vertical alignment type liquid crystal display element in which the polymerizable compound in the polymerizable liquid crystal composition is polymerized was obtained. It was confirmed that, according to the polymerization of the polymerizable compound, the alignment control force is generated with respect to the liquid crystal compound. It was also confirmed that, the vertical alignment type liquid crystal display element has excellent optical characteristics and high speed responsiveness.

Example 5

To 99.7% of the nematic liquid crystal composition shown in Example 1, 0.3% of the polymerizable compound represented by formula (IV-b) was added and homogeneously dissolved, and thus the polymerizable liquid crystal composition CLC-2 was prepared.

[Chemical Formula 19]

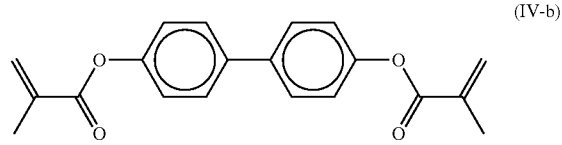

(IV-b)

There was almost no difference in physical properties of CLC-2 compared to the physical properties of the nematic liquid crystal composition shown in Example 1. CLC-2 was injected by vacuum injection to an ITO-attached cell which has been coated with a polyimide alignment film for inducing homeotropic alignment with a cell gap of 3.5 μm. After measuring pre-tilt angle of the cell (crystal rotation method), the liquid crystal cell was irradiated with UV rays using a high pressure mercury lamp through a filter for cutting UV rays of the same or shorter than 320 nm, while applying a rectangular wave of 1.8 V at a frequency of 1 kHz. The irradiation intensity on the cell surface was adjusted to 10 mW/cm² and the irradiation was performed for 600 seconds. As a result, a vertical alignment type liquid crystal display element in which the polymerizable compound in the polymerizable liquid crystal composition is polymerized was obtained. It was confirmed that, according to the polymerization of the polymerizable compound, the alignment control force is generated with respect to the liquid crystal compound. It was also confirmed that, the vertical alignment type liquid crystal display element has excellent optical characteristics and high speed responsiveness.

Example 6

To 99.7% of the nematic liquid crystal composition shown in Example 1, 0.3% of the polymerizable compound represented by formula (IV-c) was added and homogeneously dissolved, and thus the polymerizable liquid crystal composition CLC-3 was prepared.

[Chemical Formula 20]

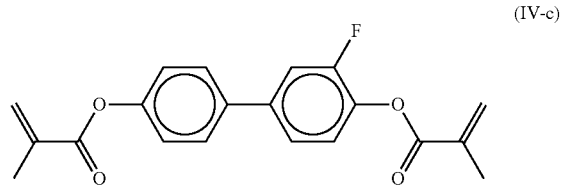

(IV-c)

There was almost no difference in physical properties of CLC-3 compared to the physical properties of the nematic liquid crystal composition shown in Example 1. CLC-3 was injected by vacuum injection to an ITO-attached cell which has been coated with a polyimide alignment film for inducing homeotropic alignment with a cell gap of 3.5 μm. After measuring pre-tilt angle of the cell (crystal rotation method), the liquid crystal cell was irradiated with UV rays using a high pressure mercury lamp through a filter for cutting UV rays of the same or shorter than 320 nm, while applying a rectangular wave of 1.8 V at a frequency of 1 kHz. The irradiation intensity on the cell surface was adjusted to 10 mW/cm² and the irradiation was performed for 600 seconds. As a result, a vertical alignment type liquid crystal display element in which the polymerizable compound in the polymerizable liquid crystal composition is polymerized was obtained. It was confirmed that, according to the polymerization of the polymerizable compound, the alignment control force is generated with respect to t the liquid crystal compound. It was also confirmed that, the vertical alignment type liquid crystal display element has excellent optical characteristics and high speed responsiveness.

The invention claimed is:

1. A liquid crystal composition, comprising:
  as a first component, a compound-represented by formula (I) with a content of 5% to 25%,

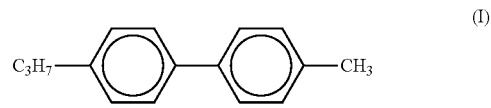

(I)

as a second component, one or more compounds selected from a group of compounds represented by both formulas (II-1) and (II-2):

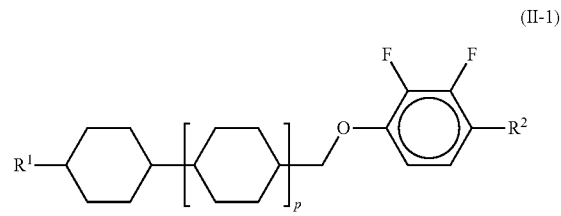

(II-1)

(II-2)

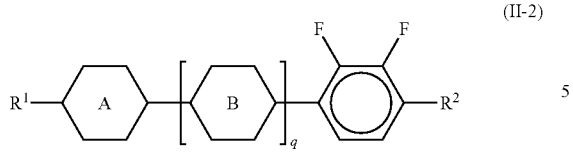

wherein, $R^1$ and $R^2$ each independently represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one —$CH_2$— or two or more non-adjacent —$CH_2$— present in $R^1$ and $R^2$ may be each independently substituted with —O— and/or —S—, one, or two or more hydrogen atoms present in $R^1$ and $R^2$ may be each independently substituted with a fluorine atom or a chlorine atom, and wherein ring A and ring B each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, except ring B cannot be the trans-1,4-cyclohexylene group or the 1,4-cyclohexenylene group, and p represents 0, 1, or 2, and q represents 1 or 2, the second component having a negative dielectric anisotropy ($\Delta\epsilon$) with an absolute value of greater than 3, as a third component, one or more compounds selected from a group of compounds represented by formula (III-G) to formula (III-H):

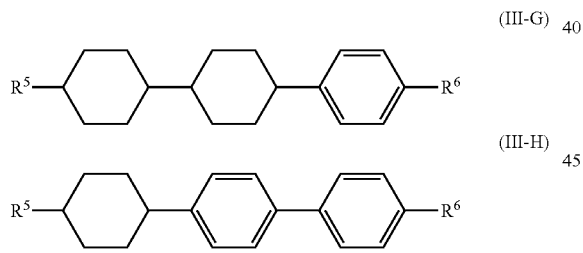

wherein, $R^5$ represents an alkyl group having 1 to 5 carbon atoms or an alkenyl group having 2 to 5 carbon atoms and $R^6$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms; and wherein the second component is included at a content of 20% to 80% by mass.

2. The liquid crystal composition according to claim 1, wherein $\Delta\epsilon$ at 25° C. is in a range of −2.0 to −6.0, a refractive index anisotropy ($\Delta n$) at 25° C. is in a range of 0.08 to 0.13, viscosity ($\eta$) at 20° C. is in a range of 10 to 30 mPa·s, and a nematic phase-isotropic liquid phase transition temperature ($T_{ni}$) is in a range of 60° C. to 120° C.

3. The liquid crystal composition according to claim 1, wherein a content of the second component is 40% to 70% by mass.

4. The liquid crystal composition according to any one of claims 1, 2 and 3 comprising: as the second component, a group of compounds comprising at least one formulation of each of formulas (II-1A), (II-1B) and (II-2A):

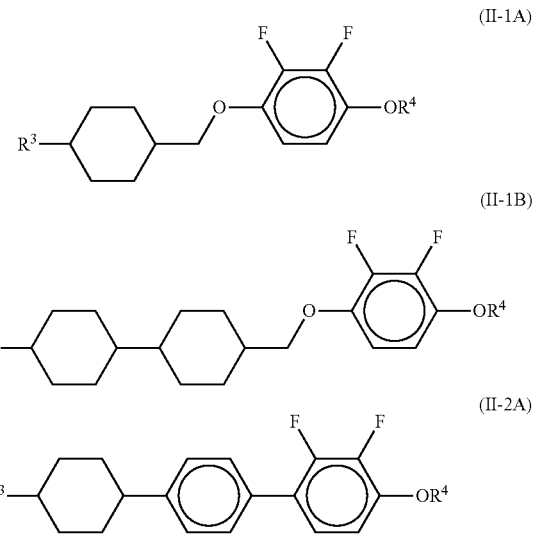

wherein $R^3$ and $R^4$ each independently represent an alkyl group having 1 to 10 carbon atoms or an alkenyl group having 2 to 10 carbon atoms, and one or two or more hydrogen atoms present in $R^3$ and $R^4$ may be each independently substituted with a fluorine atom.

5. The liquid crystal composition according to claim 1 further comprising: one or more compounds selected from a group of compounds represented by formulae (III-A) to (III-E) and (III-I) to (III-J):

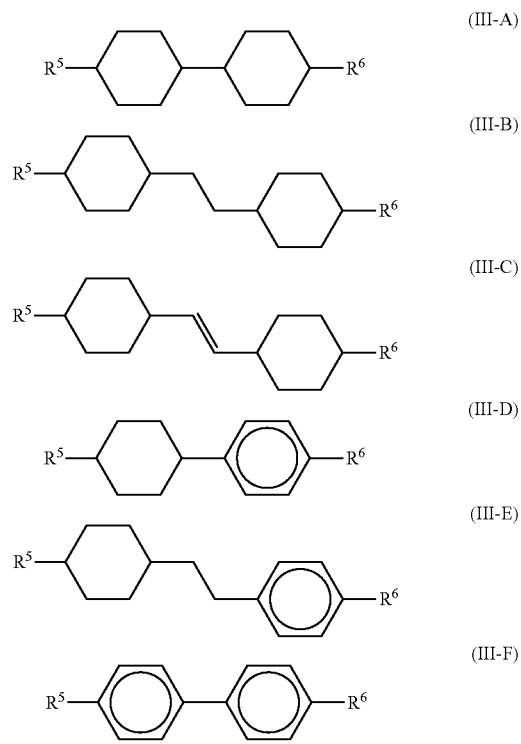

-continued

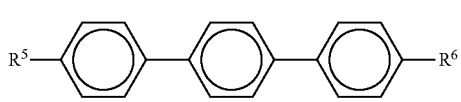

(III-I)

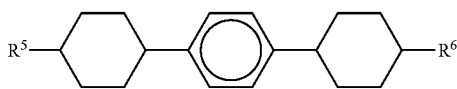

(III-J)

wherein, R⁵ represents an alkyl group having 1 to 5 carbon atoms or an alkenyl group having 2 to 5 carbon atoms and R⁶ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, with the proviso that, cases in which R⁵ is a methyl group and R⁶ is a propyl group, and in which R⁵ is a propyl group and R⁶ is a methyl group in formula (III-F) are excluded.

6. The liquid crystal composition according to claim 4, simultaneously comprising formula (I), formulas (II-1A), (II-2A), and formula (III-A):

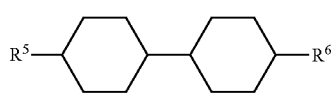

(III-A)

wherein, R⁵ represents an alkyl group having 1 to 5 carbon atoms or an alkenyl group having 2 to 5 carbon atoms and R⁶ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, with the proviso that, cases in which R⁵ is a methyl group and R⁶ is a propyl group are excluded.

7. The liquid crystal composition according to claim 4, simultaneously comprising formula (I), formulas (II-1B), (II-2A), and formula (III-A):

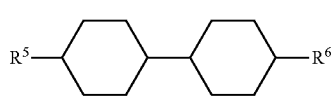

(III-A)

wherein, R⁵ represents an alkyl group having 1 to 5 carbon atoms or an alkenyl group having 2 to 5 carbon atoms and R⁶ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, with the proviso that, cases in which R⁵ is a methyl group and R⁶ is a propyl group are excluded.

8. The liquid crystal composition according to claim 4, simultaneously comprising formula (I), formulas (II-1A), (II-1B), (II-2A), and formula (III-A):

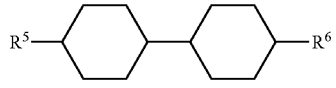

(III-A)

wherein, R⁵ represents an alkyl group having 1 to 5 carbon atoms or an alkenyl group having 2 to 5 carbon atoms and R⁶ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, with the proviso that, cases in which R⁵ is a methyl group and R⁶ is a propyl group are excluded.

9. The liquid crystal composition according to claim 1, wherein a content of the liquid crystal compound having a chlorine atom is less than 10%.

10. The liquid crystal composition according to claim 1, wherein a content of the liquid crystal compound having an alkenyl group is less than 10%.

11. The liquid crystal composition according to claim 1 additionally comprising a polymerizable compound.

12. A liquid crystal display element using the liquid crystal composition described in claim 1.

13. A liquid crystal display element for an active matrix drive using the liquid crystal composition described in claim 1.

14. A liquid crystal display element for a VA mode, a PSA mode, a PSVA mode, an IPS mode, or an ECB mode using the liquid crystal composition described in claim 1.

15. The liquid crystal composition according to claim 1, wherein 100% by mass of the liquid crystal composition consists of:
the first component;
the second component; and
one or more compounds selected from a group of compounds represented by formula (III-A) to formula (III-J):

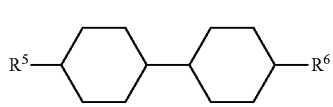

(III-A)

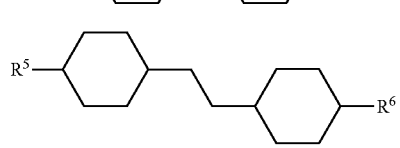

(III-B)

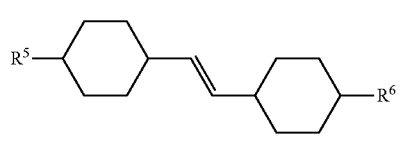

(III-C)

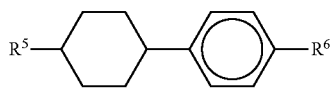

(III-D)

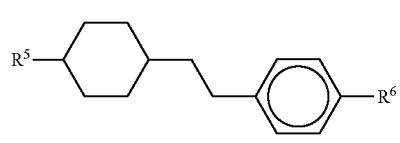

(III-E)

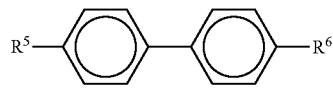

(III-F)

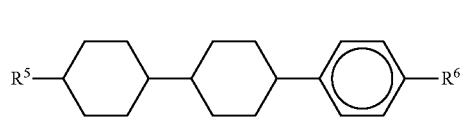

(III-G)

-continued

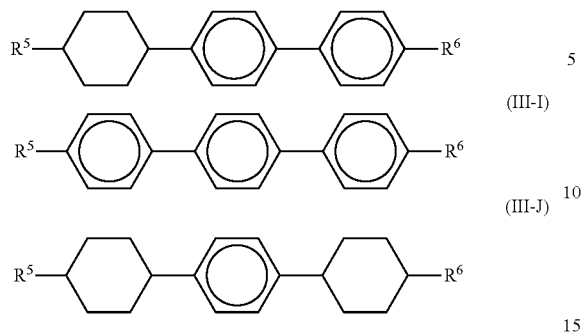

wherein, $R^5$ represents an alkyl group having 1 to 5 carbon atoms or an alkenyl group having 2 to 5 carbon atoms and $R^6$ represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, with the proviso that, cases in which $R^5$ is a methyl group and $R^6$ is a propyl group, and in which $R^5$ is a propyl group and $R^6$ is a methyl group in formula (III-F) are excluded.

* * * * *